Feb. 26, 1935. A. J. SMITH 1,992,510
METHOD OF AND APPARATUS FOR FORMING HOLLOW GLASSWARE
Filed April 20, 1934 3 Sheets-Sheet 1
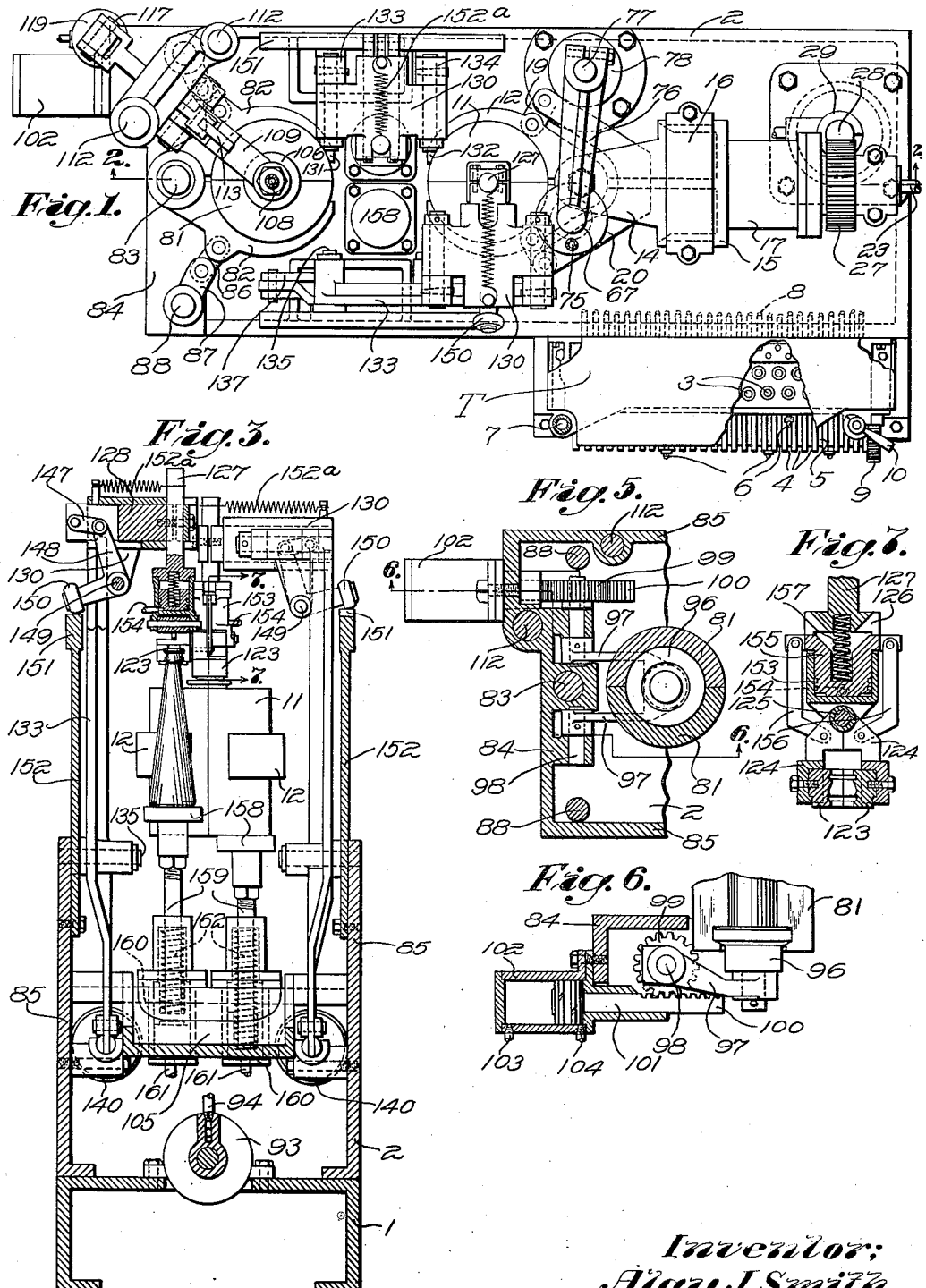
Inventor:
Algy J. Smith
by Brown + Parham
Attorneys
Witness:
W. B. Thayer

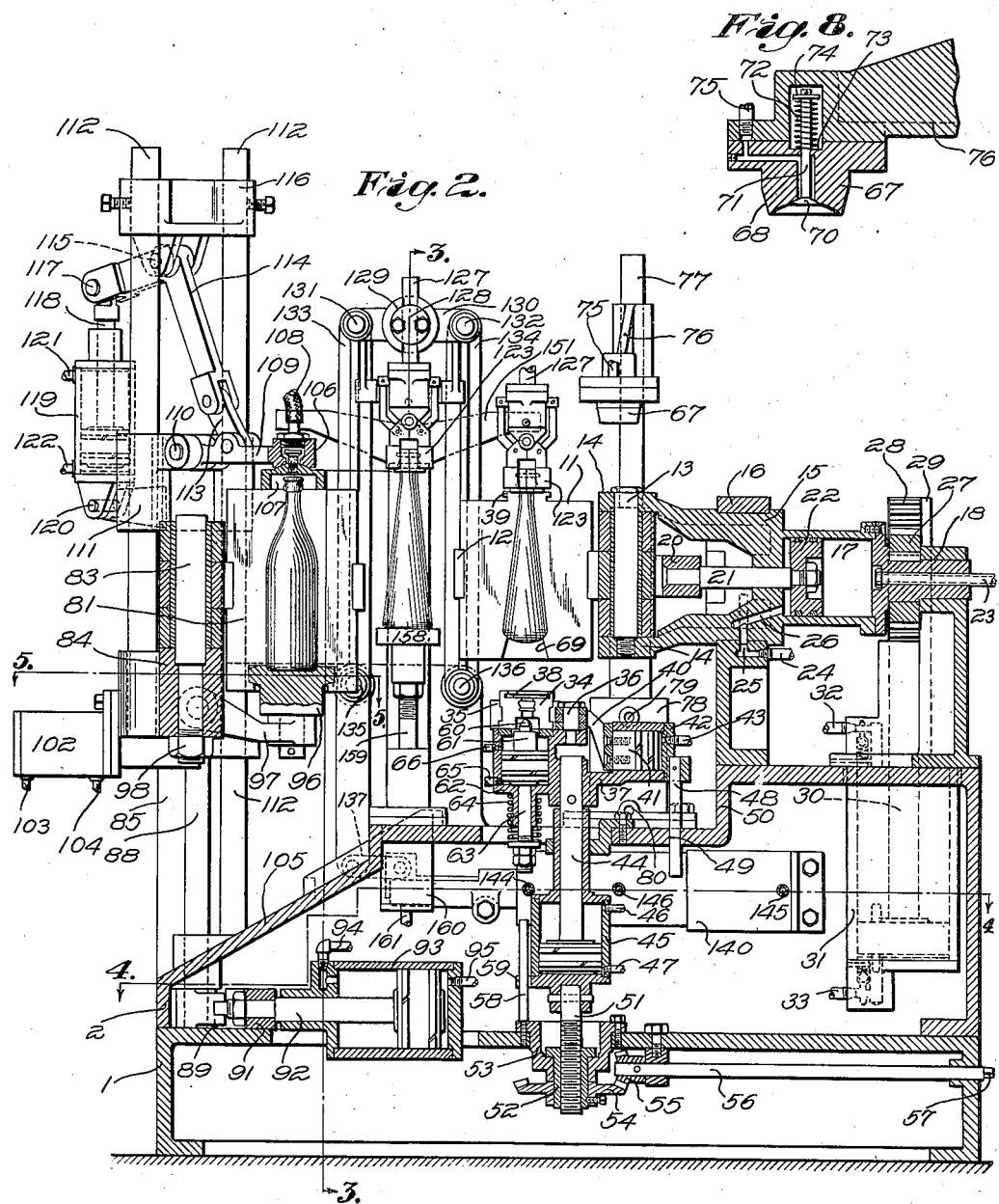

Feb. 26, 1935.   A. J. SMITH   1,992,510
METHOD OF AND APPARATUS FOR FORMING HOLLOW GLASSWARE
Filed April 20, 1934   3 Sheets-Sheet 3
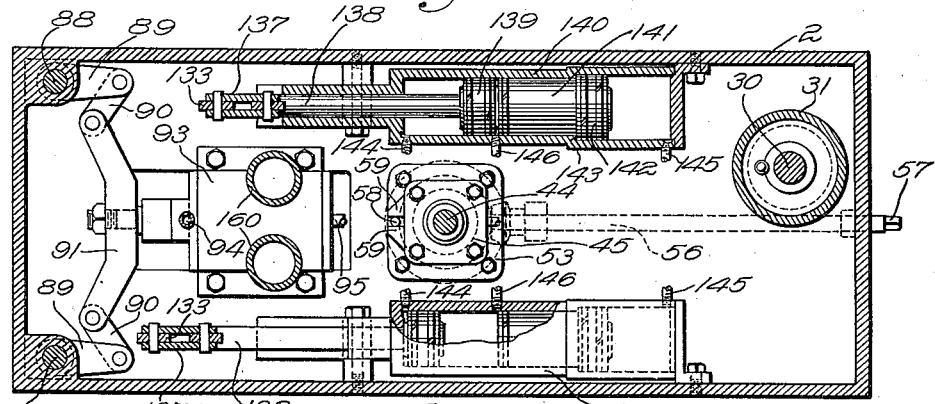
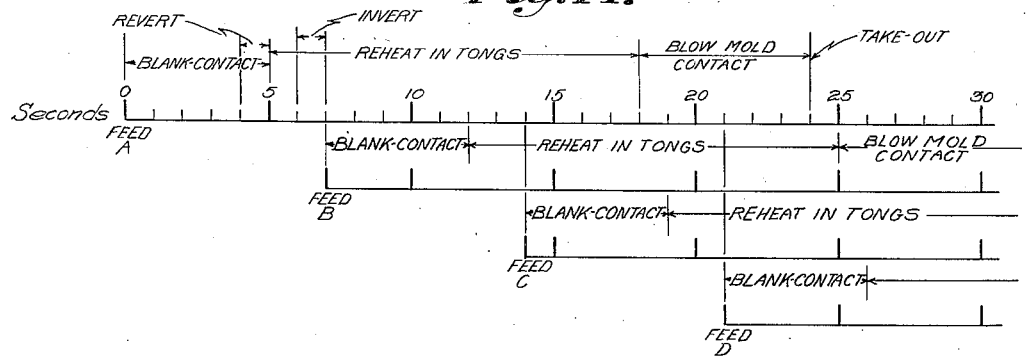
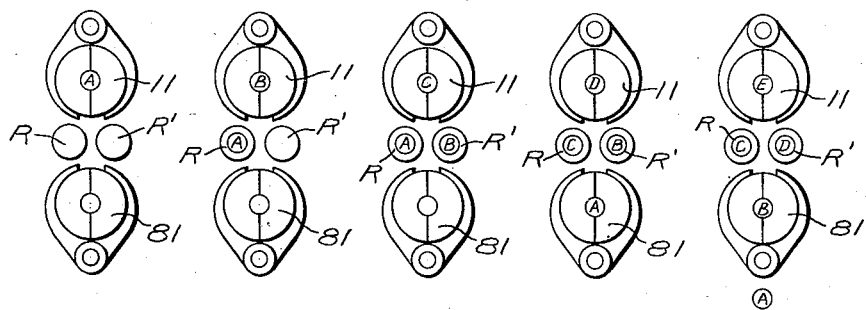

Patented Feb. 26, 1935

1,992,510

UNITED STATES PATENT OFFICE 1,992,510

METHOD OF AND APPARATUS FOR FORMING HOLLOW GLASSWARE

Algy J. Smith, Bloomfield, Conn., assignor to Hartford-Empire Company, Hartford, Conn., a corporation of Delaware Application April 20, 1934, Serial No. 721,417

19 Claims. (Cl. 49—5)

This invention relates to a method of and apparatus for the manufacture of hollow glass articles and more particularly to such a method and apparatus wherein there is what may be termed a "quadruple overlapping cycle", that is, wherein at least four charges of glass may be simultaneously in the process of formation into completed articles at the same time, all of these charges having been initially supplied to the same blank mold as will be hereinafter more fully set forth.

Among the objects of my invention are to provide a method of and apparatus for forming hollow glass articles by the "two-mold" process, that is, a process in which a blank is formed in a blank mold and this blank after some reheating is thereafter blown to final form in a final blow mold without the use of any intermediate mold or molds, and wherein provision is made for operating the machine according to a "quadruple overlapping cycle" as above set forth.

A further object of the present invention is to provide a method and apparatus of the character above set forth wherein a blank mold and final blow mold aways cooperate solely with each other and with no other molds in forming articles.

A further object of the present invention is to provide suitable transfer means, which preferably take the form of tongs and are preferably plural in number and so constructed and arranged as to transfer blanks from a blank mold to a blow mold in paths each having an intermediate position or station, which may be either moving or stationary, at which intermediate positions a plurality of blanks may be simultaneously supported for purposes of reheating them. In connection with the above, it is an object of my invention to provide for the reheating of one blank in one tongs mechanism in such position that another tongs mechanism also usable in transferring blanks from the same blank mold to the same blow mold may be moved between these molds without interfering with the reheating of the first mentioned blank.

A further object of the present invention is to provide an apparatus of the character above set forth of the single unit type which may, if desired, be pluralized in a manner similar to that now in use in the commercial "Hartford I. S." machine.

A further object of the present invention is to provide a method and apparatus for forming hollow glass articles wherein an invertible blank mold is used in conjunction with a noninvertible neck ring and associated mechanism and thereby the entire mechanism made mechanically simpler without loss in efficiency and in the quality of the articles being formed.

Other and further objects of the present invention will become apparent from a reading of the following specification and appended claims when taken in connection with the accompanying drawings, in which:

Figure 1 is a plan view of a single unit machine embodying my invention;

Fig. 2 is a view of the machine substantially in vertical section on the line 2—2 of Fig. 1;

Fig. 3 is a view substantially in vertical section on the line 3—3 of Fig. 2;

Fig. 4 is a view substantially in horizontal section on the line 4—4 of Fig. 2;

Fig. 5 is a detail view substantially in horizontal section on the line 5—5 of Fig. 2, showing the operating mechanism for the blow mold bottom;

Fig. 6 is a detail view substantially in vertical section on the line 6—6 of Fig. 5;

Fig. 7 is a detail view substantially on the line 7—7 of Fig. 3 illustrating the tongs opening and closing mechanism;

Fig. 8 is a detail view in vertical section of the combined settle blow head and counterblow baffle;

Figs. 9 to 13 inclusive are diagrammatic views illustrating the cycle of the apparatus; and Fig. 14 is a timing chart illustrating a possible cycle of the apparatus in producing a plurality of articles of a particular kind and weight showing the various overlapping time relationships thereof.

I have chosen to illustrate my invention as applied to a stationary single unit machine, including a single blank mold and a single blow mold, these molds being mounted in substantially fixed relation to each other upon a stationary base, and all the various operations being controlled by a timing means substantially similar to that used in connection with the commercial "Hartford I. S." machine. It is to be understood, however, that as many of these units as desired may be associated together, preferably each with its individual timer, as in the case of the commercial "Hartford I. S." machine and may be supplied with charges of glass from a single feeder, with a suitable charge distributing means (not shown herein).

Further it is contemplated that certain of the broad principles of my invention may, if desired, be applied to rotary type machines of either the single or two-table types, and further that such rotary machines used may be either intermittently or continuously rotated. The present machine is therefore to be considered merely as illustrative of the invention and the invention is not limited thereto.

Base structure and timer mechanism

Turning now to the accompanying drawings, the machine is shown as supported upon a lower base 1, upon which is secured an upper base structure 2, these structures being secured together in any suitable manner.

Suitably secured in any desired fixed relation to the base structures 1 and 2 is a timer generally indicated at T, this timer preferably being of the type now in commercial use in the "Hartford I. S." machine, and being explained in detail in Ingle Patents 1,843,159, granted Feb. 2, 1932, 1,843,160 granted Feb. 2, 1932, and 1,911,119, granted May 23, 1933. Reference may be had to these patents for a full and complete description of the structure and its manner of operation.

For the purposes of the present application, it may be said that the timer T comprises a series of valves 3, each of which is in alignment with a slot 4 on a rotatable drum 5. Suitable short and long buttons 6 are adjustably positionable at any desired points about the slots 4 and may be locked in such adjusted positions. The arrangement of the parts is such that when a short button is moved by the rotation of the drum 5 to a predetermined position in respect to valve operating means (not particularly illustrated herein), the valve is opened to admit pressure from the main pressure line 7 to the associated pressure line as 8 leading to an associated pneumatically operated mechanism. This pressure is supplied continuously through the valve until a long button positioned in the same slot 4 comes into engagement with the valve operating mechanism of the particular valve being considered, at which time the valve is closed to pressure and the associated line 8 opened to exhaust to the atmosphere.

The drum 5 may be suitably clutched to and declutched from a central axial shaft carrying secured thereto a large gear 9 by a single tooth type of clutch mechanisnm operated under control of the hand lever 10 in a manner particularly illustrated and described in the Ingle Patent No. 1,911,119 above referred to. The gear 9 is adapted to be continuously driven from any suitable source of power (not herein illustrated), which source of power is preferably arranged also to drive a glass feeding device associated with and arranged to supply charges to the forming machine. Thus the feeder and machine will be properly synchronized each with the other, the single tooth clutch device being so constructed and arranged that it will only clutch the drum 5 to the gear 9 at one relative angular position. As the drum 5 rotates one revolution for each complete mechanical cycle of the machine, the machine will always be properly synchronized with the feeder when the clutch is engaged. Inasmuch as this timer structure is now in commercial use and does not form any part of my present invention, no further description thereof will be given.

The blank mold and operating means therefor

There is illustrated at 11 a blank mold of any conventional type, this mold being formed in the usual manner in mating halves, each of which is supported in a suitable mold holder 12 pivoted on a common pintle 13. The pintle 13 is supported in ears 14 extending from an invertible head 15 which is suitably journaled in a large bearing 16. The head 15 is also provided with a cylinder 17, which may be integral therewith, the opposite end of which cylinder provides a further trunnion journal 18 for the head 15.

For opening and closing the blank mold, the holders 12 thereof are connected by short links 19 to the outer ends of a substantially V-shaped yoke member 20, which is mounted upon the piston rod 21 of the piston 22 in cylinder 17. Pressure may be supplied to the head end of cylinder 17 through the pipe 23 from the timer T, this pipe being swively arranged in the cylinder head in any suitable manner. Pressure may be supplied to the opposite end of the cylinder through the pipe 24 from the timer T, this pipe communicating with a passage 25 in the bearing 16, which passage is in alignment with a passage 26 formed in the head 15 when the blank mold is in neck-up position, as illustrated in Fig. 2. This is the only position at which it is desired to open the blank mold. As the device is constructed the blank mold cannot be opened except in neck-up position, although it may be closed in any inverted position by the admission of pressure through the pipe 23 from the timer T.

For inverting the blank mold, a portion of the trunnion or journal portion 18 of the head 15 is provided with a pinion 27 secured thereto, which is in mesh with a rack 28 arranged for vertical movement in a suitable guide 29 and secured to or forming a part of the piston rod 30 of a pneumatic cylinder 31. Pressure may be conducted to the opposite ends of the cylinder 31 through the pipes 32 and 33 from the timer T at the desired times. Provision preferably is made for suitably cushioning the last portion of the stroke of the piston in this cylinder in either direction in a manner shown diagrammatically herein and described more particularly in the Ingle Patent 1,911,119 above referred to. Inasmuch as this cushioning structure forms no part of the present invention, it will not be described further. The blank mold is thus invertible about a fixed horizontal axis with respect to the base members 1 and 2.

Neck ring and neck pin arrangements and associated mechanism

While the blank mold of the machine shown in the accompanying drawings is invertible as above set forth, I prefer to employ in connection with this structure, a non-invertible neck ring, provision being made for closing this neck ring in cooperative relation with the blank mold when the latter is in neck-down position and preferably also for relatively moving the blank mold and neck ring, in the present instance, moving the neck ring downwardly to free the blank mold for inversion once the blank has been completely formed therein.

As shown in the accompanying drawings, there is a neck ring 34, which is formed in the usual manner in mating portions or halves supported by neck ring holders 35, which are pivoted on a common pintle 36, this pintle being preferably carried by a vertically movable head 37, which supports the entire neck ring structure and associated mechanism. The neck ring 34 is provided with an undercut recessed portion 38 adapted to engage around a complementary portion 39 formed on the neck end of the blank mold so as to align the cavities of the blank mold and neck ring when they are in cooperative relation with each other.

For opening and closing the neck ring 34, the holders 35 thereof are provided with suitable links (not shown) connecting them to a yoke member 40, which may be connected rigidly with the piston 41 in the pneumatic cylinder 42 carried by the head 37. Pressure may be conducted to the head end of the cylinder 42 from the timer T through a pipe 43 for closing the neck ring when such action is desired. Opening of the neck ring may be accomplished by one or more springs (not shown) extending between suitable points on the yoke 40 and suitably relatively fixed anchorages preferably on or adjacent to the head end of the cylinder 42.

For moving the neck ring structure vertically to position the neck ring in cooperation with the blank mold, the entire structure 37 is mounted on the upper end of the piston rod 44 of a pneumatic cylinder 45, to the opposite ends of which pressure may be conducted from the timer T through the pipes 46 and 47. In order to insure that the movement of the head 37 is vertical and that there is no rotary movement about the axis of piston 44, a downwardly extending guide rod 48 may be provided secured to a portion of the head 37 and freely slidable through a suitable hole 49 in the upper panel 50 of the base member 2.

In order to adjust the neck ring and its associated structure vertically to compensate for blank molds of different heights, the entire structure including the cylinder 45 is mounted upon the upper end of a screw shaft 51, which extends through and is threaded in a rotatable bushing 52 swiveled in a bearing member 53 secured to the upper panel of the base member 1 as illustrated. The rotatable bushing 52 has secured thereto a beveled gear 54 which meshes with a beveled pinion 55 mounted on a horizontally extending shaft 56, the outer end of which projects from one side of the machine and is squared as at 57 for the reception of a suitable tool. Thus by applying a tool to the squared end 57 of the shaft 56 and rotating this shaft, the neck ring structure including the cylinder 45 may be adjusted up or down to compensate for blank molds of different heights. In order to prevent rotation of the cylinder 45 and parts carried thereby about the axis thereof and of the screw shaft 51, which are aligned, there is provided a guide rod 58 secured in the base 1 and extending between spaced guide portions 59 rigid with the cylinder 45 (Figs. 2 and 4).

Associated with the neck ring 34 is a neck pin 60 which is preferably interchangeably secured to the upper end of a piston rod 61 of a pneumatic cylinder 62, the piston of which is provided with a downwardly extending rod 63 axially of the cylinder and extending through the lower head thereof. Intermediate the washer or other abutment secured on the rod 63 and the lower head of cylinder 62 is a spiral compression spring 64, which constantly tends to move the piston downwardly in the cylinder thus tending to lower the neck pin 60. When it is desired to raise the neck pin to its uppermost position in cooperative relation with the neck ring, as during the charging and settle blowing of a charge of glass in the blank mold, pressure is admitted to the lower end of cylinder 62 through the pipe 65 from the timer T. When pressure is exhausted through the pipe 65, the neck pin 60 is moved downwardly to the position illustrated in Fig. 2 by the action of the spring 64, thus moving the piston in cylinder 62 below a port entering the side of that cylinder and communicating with the timer T through a pipe 66. Counterblowing pressure may be supplied from the timer through this pipe 66 into the cylinder 62 above the piston thereof and may thence pass upwardly around the neck pin and into the glass to counterblow the charge when such action is desired. It will be seen from the above that the neck pin is movable with the neck ring as the neck pin and its operating mechanism are all mounted in the head 37 and further that the neck pin is movable with respect to the neck ring under control of the timer T by supplying and exhausting pressure to and from the pipe 65 entering the neck pin cylinder 62 beneath the piston thereof.

*Combined settle head and counterblow baffle and associated mechanism*

There is preferably used in conjunction with my machine, a combined settle blow head and counterblow baffle which may be constructed as shown particularly in Fig. 8, this head being indicated in that figure generally at 67 and being provided with a beveled outer surface 68 adapted to seat in a corresponding bevel 69 in the bottom end of the blank mold.

The head 67 is provided with a poppet type valve 70 therein which is mounted on the lower end of a stem 71 which extends upwardly into the head and is provided with a compression spring 72 coiled thereabout and extending between a shoulder 73 in the head and a suitable abutment 74 on the stem 71, thus tending to hold the valve closed at all times. The valve 70 is unseated by the admission of pressure to the head 67 through the pipe 75 and the passages illustrated from the timer T to settle blow the charge, but once this pressure is cut off as particularly during counterblowing, the valve 70 will be seated under the action of the spring 72.

The head 67 is suitably supported upon the outer end of an arm 76 extending laterally from a vertical shaft 77 which comprises the piston rod of a pneumatic cylinder 78 secured to the base member 2. Pressure may be conducted to the cylinder 78 from the timer T through the passages indicated at 79 and 80 (Fig. 2). The piston rod of the cylinder 78 is preferably provided with a laterally extending roller or cam follower (not shown) which cooperates with a twist cam for imparting a substantially helical movement to the head 67 at the upper portion of its path of travel, that is when away from the blank mold 11, so that the head 67 is movable between the position shown in Figs. 1 and 2 and a position in cooperative relation with the blank mold when the latter is in charge receiving position. Inasmuch as this construction is well known in the art and is embodied in the commercial Hartford I. S. machine, as set forth in the Ingle patents above referred to, no particular illustration of further description of this construction will be given herein.

*Final blow mold, mounting and operating mechanism therefor*

Adjacent to the end of the base members 1 and 2 opposite that occupied by the blank mold and its operating mechanism, there is located a blow mold 81, which may be formed in a conventional manner in mating sections or halves each supported by a holder 82, the holders being pivoted upon a common pintel shaft 83 which is supported by a stationary cross member 84 secured to or integral with the base member 2 and in any event connected thereto by side panel members 85.

Means are provided for opening and closing the blow mold 81 as desired, such means preferably taking a form the same as or similar to that disclosed in the Ingle Patent No. 1,911,119 for operating the blow mold of the commercial "Hartford I. S." machine, although any other desired means may be used in this connection. As shown, the mold holders 82 are connected by short link 86 (Fig. 1) to crank arms 87 mounted on the upper ends of a pair of vertical rock shafts 88 which are journaled in suitable bearings in the base 2 proper and in the cross member 84 thereof. The rock shafts 88 (Figs. 2 and 4) are provided adjacent to their lower ends with crank arms 89 rigid therewith, which are connected as by short links 90 with a crosshead 91 secured to the outer end of the piston rod 92 extending from a pneumatic cylinder 93 which is fixed to the base member 1. Pressure may be conducted to the opposite ends of cylinder 93 from the timer T through the pipes 94 and 95 to open and close the blow mold when desired.

*Blow mold bottom, mounting and operation thereof*

The blow mold 81 is provided with the usual type of bottom plate illustrated at 96 (Figs. 2, 5 and 6). This bottom plate is preferably interchangeably mounted upon the outer ends of arms 97 and secured to a horizontally extending rock shaft 98, which is journaled in suitable bearing portions in the cross member 84, as shown best in Fig. 5.

Means are provided for swinging the blow mold bottom plate 96 about the axis of the rock shaft 98, such means comprising a pinion 99 secured to the rock shaft 98 and meshing with the teeth of a rack 100, which is formed on the outer end of a piston rod 101 extending from a pneumatic cylinder 102. Pressure may be supplied to the opposite ends of cylinder 102 from the timer T through pipes 103 and 104 as illustrated. Thus when pressure is applied through the pipe 103 and exhausted through the pipe 104, the blow mold bottom 96 will be moved to its operative position so that the blow mold may close about it and lock it in such position in the usual manner. After the blow mold is opened, pressure may be reversed in the cylinder 102 and the blow mold bottom 96 swung downwardly to permit any glass or foreign material to fall from it by gravity. This action is particularly desirable in the event that a malformed bottle is positioned on the bottom plate which is not removed in the normal course of operation of the machine by the automatic or manual removal means, in which event the swinging downwardly of the blow mold bottom will permit the glass to fall out on the inclined surface 105 (Fig. 2) of the top of the base member 2, so that this glass may be discharged outside the machine at a readily accessible point.

*Final blow head and operating means therefor*

Means are provided for supplying final blowing pressure to blanks within the blow mold 81 to blow them to final form, such means comprising a head generally indicated at 106 (Figs. 1 and 2). This head may have a portion 107 freely floating with respect thereto so as to seat properly on the top of the blow mold 81. Inasmuch as this construction is well known in the art, no particular description thereof will be given. The connection between the floating portion 107 of the head and the main portion thereof may if desired include a valve mechanism automatically unseated to admit pressure through the head by the seating of the member 107 on the blow mold. Pressure supplied to the head 106 may if desired be controlled by the timer T, whence it may be led through the pipe 108, which may include a flexible portion as indicated. Whether or not the valve structure above referred to be included in the head 106, the supplying of pressure to the head and to the article within the blow mold may be adjustably controlled as desired as to timing by the timer T.

The head 106 is mounted on the outer end of an arm 109 pivoted at 110 to a stationary cross member 111, which is vertically adjustably mounted on a pair of stationary shafts 112, one of which is secured in the base 2 and the other of which extends down only as far as the cross member 84 of the base 2, as shown in Figs. 2 and 5.

For moving the blow head 106 to and from its operative position on the blow mold 81, the arm 109 is connected by a short link 113 with one end of a bell crank lever 114 which is pivoted at 115 to a stationary cross member 116 which is vertically adjustably secured to the shafts 112. The other arm of the bell crank lever 114 is pivoted at 117 to the upper end of the piston rod 118 of a pneumatic cylinder 119, which is in turn pivoted at 120 to the cross member 111. Pressure may be conducted to and exhausted from the opposite ends of the cylinder 119 by the timer T through the pipes 121 and 122. The lost motion incident to the movement of the pivot 117 about the pivot 115 is taken up by the swing of the cylinder 119 about its pivot 120 as illustrated in Fig. 2.

If it is desired to adjust the blow head 106 and its entire mechanism vertically to compensate for molds of different heights, this may be accomplished by adjusting the stationary cross members 111 and 116 up or down as may be necessary on the shafts 112.

*Transfer means, construction, mounting and operation thereof*

For transferring blanks from the blank mold to the blow mold, I provide plural transfer means, that is, in the present machine there are two separate and distinct transfer means for transferring blanks from a single blank mold to a single blow mold, each of these transfer means being identical with the other, but being independently controlled by the timer T, as will be hereinafter set forth.

Each of the transfer means comprises tongs, opening and closing mechanism therefor and means for moving the tongs first from a position in cooperation with the blank mold to an intermediate position laterally offset from the line of centers of the blank and blow molds and thereafter from that position to a position in cooperation with the blow mold. At the intermediate position of the tongs and of a blank held therein, such tongs and blank will not interfere with any movements which may be desired for the other of the tongs mechanisms either with or without a supported blank.

As shown in the accompanying drawings (see

Fig. 7), the tongs are illustrated as a pair of mating gripping members 123 which in the illustration are shown as formed in the shape of the finish portion of the article to be transferred. It will be understood, however, that any suitable type of tongs, including simple gripping jaws, not particularly shaped to conform to the configuration of the neck portion of the article, may be used if desired.

The gripping portions of the tongs are removably mounted in tongs carrying members 124 which are pivoted on a common pintle 125 in the lower end of a head 126. The head 126 is provided with an upwardly extending stem 127, which is secured in a slide block 128 (Fig. 3), this block being slidable in a circular hole 129 (Fig. 2) extending transversely of the machine, that is, transversely of the line of centers of the blank and blow molds as illustrated. The hole 129 is formed in a cross head 130 pivoted at 131 and 132 on parallel pintles carried by the upper ends respectively of a pair of parallel levers 133 and 134, these levers being pivoted on parallel fixed pivots 135 and 136. The pivots 135 and 136 are on the same level and are spaced apart the same distance as pintles 131 and 132, so that upon swinging movement of the levers 133 and 134, the cross head 130 will have a parallel motion and will always be maintained horizontal.

The lever 133 is extended downwardly through a suitable aperture in the upper plate of the base member 2 and is connected as by a link 137 (Figs. 2 and 4) with the outer end of a piston rod 138 (Fig. 4) of a piston 139 working in a pneumatic cylinder generally indicated at 140. The piston 139 is adapted to travel substantially two-thirds of the length of this cylinder and in a relatively small diameter portion thereof as clearly illustrated in Fig. 4. Also mounted for sliding movement in the cylinder 140 is a freely floating piston 141 having a small diameter portion adapted to slide in the small diameter portion of the cylinder and adapted to abut against piston 139 and also having a larger diameter portion 142 slidable in the larger diameter portion of the cylinder 140, the shoulder 143 in the cylinder 140 between the larger and smaller diameter portions serving to limit the movement of the piston 141 to the left as seen in Fig. 4. Pressure may be conducted to the opposite ends of the cylinder 140 through the pipes 144 and 145 and to a point intermediate the ends thereof immediately at the left, as seen in Fig. 4, of the left-hand position of the floating piston 141, by an intermediate pipe 146, all the pipes 144, 145 and 146 leading to the timer T, so that pressure may be independently supplied to and exhausted from any of these pipes at any desired times by the timer.

Thus, when the tongs are to be positioned in cooperation with the blank mold, pressure is exhausted through the pipe 144 and supplied through the pipe 146. Pressure may be either exhausted or supplied through the pipe 145, this being immaterial, as the piston 139 will be at its farthest left-hand position, as seen in Fig. 4. When it is desired to move the tongs from the position in cooperation with the blank mold to the intermediate position thereof, pressure is exhausted through the pipe 146 and supplied through the pipes 144 and 145. This will cause the pistons 139 and 141 to assume the positions seen at the top in Fig. 4. Under these circumstances, the larger area of the head 142 will retain the pistons in the position illustrated against the pressure effective against the smaller area behind piston 139, the shoulder 143 serving as a stop to predetermine the position of the two pistons at this point. When it is desired that the tongs be moved from their intermediate position to a position such that a blank held therein will be located so as to be enclosed by the blow mold, pressure is exhausted through the pipe 145 so that pressure supplied through pipe 144 will be effective to move the two pistons 135 and 141 to their extreme right-hand positions. As soon as the piston 139 has cleared the port opening from pipe 146, pressure should also be applied through this pipe, so as to prevent the exhaust of pressure therethrough to the atmosphere. Return movement of the tongs is preferably accomplished rapidly, as will be hereinafter explained, and may be accomplished by exhausting pressure through the pipe 144 and first admitting pressure through the pipe 145 to move the floating piston 141 to its left-hand position and thereafter pressure may be supplied to the pipe 146 to continue the movement of piston 139 to the position shown for the lower cylinder 140 in Fig. 4.

Means are provided for moving the tongs with the blanks held therein in a direction transversely of the machine, that is perpendicular to the line of centers of the blank and blow molds. Such means in the present instance is preferably operable in response to the movement of the tongs just described between the molds under the control of the cylinder 140. For this purpose, the slide block 128 is connected by a short link 147 (Fig. 3) to one end of a bell crank lever 148, which is pivoted at 149 to the cross member 130. The other arm of the bell crank lever 148 is provided with a cam roller 150 adapted to ride along the upper surface of a cam 151 (Figs. 2 and 3), which is carried by an upstanding supporting member 152 secured to a part of the panel portion 85 of the base member 2. Thus when either of the tongs is moved from either of its extreme positions to its intermediate position respectively, the corresponding roller 150 moves into the lower portion of cam 151 causing the bell crank lever 148, as seen at the left in Fig. 3, to move counterclockwise about its pivot 149 and moving its slide block 128 to the left as seen in that figure. This will cause the tongs to move laterally away from the line of centers of the molds as illustrated in Figs. 1 and 3 and also in the diagrammatic Figures 9 to 13 inclusive. The cam roller 150 is retained against the cam 151 and the slide block 128 moved outwardly (to the left as seen in Fig. 3) by a tension spring 152a extending between a suitable anchorage on the member 130 and the upwardly extending stem 127 of the tongs.

For opening and closing the tongs when desired, the head 126 is formed as a pneumatic cylinder 153 (Fig. 7) to the lower end of which pressure may be supplied through a pipe 154 from the timer T. This pressure will move the piston 155 of cylinder 153 upwardly and thus will open the tongs to which the piston is connected by links 156. Closing movement of the tongs may be effected by a compression spring 157 extending between the piston 155 and a fixed part of the head 126, these two members being suitably recessed, as illustrated in Fig. 7, in order to prevent dislocation of this spring.

*Bottom plates for controlling elongation and operating means therefor*

I preferably provide at the two reheating positions, that is the intermediate positions for the two tongs mechanisms, bottom plate means 158 which are similar each to the other, so that only one need be described. Each of these bottom plates is vertically adjustably mounted on the upper end of a piston rod 159 extending from a pneumatic cylinder 160, to the lower end of which pressure may be supplied from the timer T through a pipe 161. Downward movement of the piston within each cylinder 160 is provided by a compression spring 162 surrounding the piston rod in the cylinder 160 and extending between the upper head thereof and a recess in the piston. Thus when pressure is supplied through the pipe 161, the associated bottom plate 158 will be moved upwardly until the piston of its cylinder 160 reaches the upper limit of its travel, this limit being determined by a shoulder formed in the cylinder 160. Downward movement may be effected by exhausting pressure through the pipe 161, permitting the spring 162 to move the bottom plate 158 downwardly. The vertical adjustment of the bottom plate 158 with respect to the piston rod 159 is provided to compensate for the making of blanks of different lengths.

*Operation of the machine*

Having now described the construction and certain particular operations of the several instrumentalities of my machine, I will now describe the operation of the machine as a whole in the making of one article of glass.

The blank mold when in readiness to receive a charge of glass is in neck-down position and closed, due to pressure being applied from the timer through the pipe 33 to the inverting cylinder 31 and exhausted through the pipe 32 thereof. Thus the piston of this cylinder is moved to its uppermost position maintaining the blank mold in neck-down position. The blank mold is maintained closed by pressure being supplied through the pipe 23 and being exhausted through the pipe 24. However, when the blank mold is in neck-down position, the passages 25 and 26 are out of registry, but the upper portion of the bearing 16 is preferably relieved to a sufficient extent to permit exhaust through the passage 26 at this point.

The neck ring is closed in engagement with the blank mold so that the grooved portion 38 of the neck ring engages around the complementary portion 39 of the blank mold. Under these circumstances, the neck ring structure 37 is at its uppermost position due to pressure being supplied through the pipe 47 and exhausted through pipe 46, both of the neck ring lifting cylinder 45 and under control of the timer T. Also the neck ring is held closed by pressure being supplied to the neck ring cylinder through the pipe 43. Also at this time, the neck pin is in its uppermost position due to pressure being supplied to its operating cylinder through the pipe 65 from the timer, thus maintaining the neck pin 60 in its uppermost position against the compression of the spring 64. Counterblowing pressure in the passage 66 is of course cut off, this passage being open to exhaust at this time.

The head 67 is also out of operative position, as shown in Figs. 1 and 2, due to pressure being supplied to its operating cylinder 78 through the passage 80 and exhausted through the passage 79 under control of the timer. Also at this time, the two tongs are at their respective intermediate positions or one of them may be at the blow mold position. Under these circumstances, a charge of glass is supplied by any suitable means, as for example an automatic feeder (not shown), to the blank mold through the open upper end thereof, this charge first settling by gravity down into the neck ring and around the neck pin to some extent.

The first operation of the machine after the charge of glass has been supplied thereto is the positioning of the head 67 on the blank mold, which is accomplished by supplying pressure from the timer through the pipe 79 and exhausting pressure through the pipe 80, both these pipes being associated with the head operating cylinder 78. This action causes the head 67 to move toward the blank mold at first in a substantially helical path and thereafter in a substantially straight vertical path to its cooperative position. Settle blowing pressure is then supplied from the timer through the pipe 75 (Fig. 8) to the head 67, which first unseats the valve 70 against the compression of the spring 72 and then flows into the mold to settle the charge of glass therein and in the neck ring around the neck pin 60, thus forming the neck or finish portion of the article. After this operation has taken place a desired period of time, settle blowing pressure is cut off through the pipe 75 permitting the valve 70 to seat under the action of the spring 72.

At about this time or shortly thereafter, the neck pin 60 is withdrawn from out the neck ring by exhausting pressure through the pipe 65, thus permitting the spring 64 to pull the neck pin downwardly. After the neck pin has reached its lowermost position, counterblowing pressure may be supplied through the pipe 66 from the timer and may thence pass upwardly around the neck pin and into the blow opening formed thereby in the glass to counterblow the charge in the usual manner and against the head 67. The charge of glass is now completely formed into a blank.

The next operation is the stripping of the neck ring from around the neck of the blank, which is accomplished by exhausting pressure through the pipe 43 of the neck ring operating cylinder 42, thus permitting the springs (not shown) to open the neck ring. The neck ring may then be moved downwardly to free the blank mold and blank therein for inversion by admitting pressure through the pipe 46 and exhausting it through the pipe 47, both of the cylinder 45.

At about this same time, the head 67 is again moved to its inoperative position, as illustrated in Figs. 1 and 2, by admitting pressure through the pipe 80 and exhausting it through the pipe 79 of the head-operating cylinder 78.

The blank mold and the blank therein are now free for reversion, which is accomplished by admitting pressure to the inverting cylinder 31 through the pipe 32 and exhausting it through pipe 33. The blank mold and associated parts are now brought to the neck-up position illustrated in Fig. 2.

One of the tongs is now moved to a position over the blank mold to engage the neck of the blank, this being accomplished as hereinbefore explained by admitting pressure through the pipe 146 of the cylinder 140 and exhausting it through pipe 144. The tongs are swung to a position about the neck of the blank in open position, due to pressure being supplied to the tongs-operating cylinder 153 (Fig. 7) from the timer. When the tongs are positioned about the blank in readiness to engage it, pressure is exhausted through the pipe 154 permitting the closing of the tongs under the action of the spring 157.

At about this same time the blank mold is opened by admitting pressure through the pipe 24 and passages 25 and 26 and exhausting pressure through the pipe 23. The blank is now supported by the tongs and may be moved for transfer.

The blank is now moved to the intermediate reheating position by admitting pressure to the tongs transfer cylinder 140 through the pipes 144 and 145 and exhausting pressure through the pipe 146. The blank is moved laterally of the line of centers during this movement under the action of the spring 152a due to the associated cam roller riding into a low portion of cam 151. When the blank has arrived at the reheating position, the bottom plate 158 is positioned beneath it by admitting pressure to the operating cylinder 160 thereof through the pipe 161. The blank is held in this position for reheating for a material period of time, as will be hereinafter set forth and as will be obvious from a consideration of Figs. 9 to 14 inclusive.

When the reheating has taken place for a desired period of time, the blank is transferred from the intermediate reheating position to the blow mold, this time by continuing to admit pressure to the pipe 144, exhausting pressure through the pipe 145 and shortly thereafter admitting pressure through the pipe 146, all of the tongs operating cylinder 140. The blow mold is of course open at this time due to pressure being admitted through the pipe 95 and exhausted through the pipe 94 of the blow mold-operating cylinder 93, thus the piston thereof is at the left-hand position, considering this cylinder as illustrated in Fig. 2.

The bottom plate 96 is preferably moved to its horizontal operative position just prior to the positioning of a blank at the blow mold position, this being accomplished by admitting pressure to the cylinder 102 through the pipe 103 and exhausting it through pipe 104 (see Fig. 6). The blow mold is then closed about the blank in supporting relation thereto by reversing the flow of pressure to the cylinder 93 through the pipes 94 and 95 and moving the piston thereof to the position shown in Fig. 2. The tongs are then released from around the neck portion of the blank by admitting pressure to the tongs operating cylinder 153 through the pipe 154 and the tongs then moved back to their intermediate position by admitting pressure to the tongs by the cylinder 140 through the pipes 144 and 145 and exhausting pressure through the pipe 146.

The final blow head 106 is then positioned on the blow mold 81 by admitting pressure to the cylinder 119 through the pipe 121 and exhausting it through pipe 122, thus moving the parts to the position shown in Fig. 2. Final blowing pressure may then be supplied to the final blowing head 106, through the pipe 108 and under the control of the timer to final blow the blank and completely form the desired article.

After the article has been formed complete, the blow head 106 is again moved to its inoperative position by admitting pressure to the cylinder 119 thereof through the pipe 122 and exhausting it through pipe 121. The blow mold is then opened by admitting pressure through the pipe 95 and exhausting it through pipe 94, both of cylinder 93. The finished article may then be removed from the blow mold either by hand or by any suitable mechanical or automatic device. Inasmuch as such device does not form any part of the present invention, it is not illustrated herein.

After the article has normally been removed from off the blow mold bottom plate 96, the bottom plate is swung downwardly by admitting pressure through the pipe 104 of the cylinder 102 and exhausting it through pipe 103. At this time any glass remaining on the bottom plate will be tipped off it and will slide down the inclined surface 105 to a desired cullet receiving point.

The cycle of the machine

In Figs. 9 to 13, I have illustrated a cycle for the machine in forming a plurality of articles illustrating the various events which may take place simultaneously. In Fig. 9 a charge of glass A has been supplied to the blank mold 11 and is being formed into a blank therein.

In Fig. 10 is illustrated the next step where the charge A has been formed into a blank and is now supported by the tongs in the intermediate reheating position R. At the same time a charge B has been supplied to the blank mold 11 and is being formed into a blank therein.

In Fig. 11, a next step in the process is shown where the charge A, which is now a blank, is still reheating at the position R; the charge B, also a blank, is reheating at the other reheating position R'; and a third charge of glass C has been supplied to the blank mold and may be in the process of being formed into a blank therein.

In Fig. 12 is illustrated the next step of the process, this being the first in which all the positions are in use. As shown in this figure, the charge or blank A has now been moved to a position within the final blow mold 81 and blowing pressure may be supplied thereto at any desired time. The charge B, which is still in the form of a blank, is still reheating at the reheating position R'. The charge C which is now also a blank is now reheating at the reheating position R in the same tongs by which the charge A was transferred from the blank mold to the blow mold. A fourth charge of glass D is now located in the blank mold and may be in the process of being formed into a blank therein. Under these circumstances, four charges of glass, all of which were supplied in succession to the same blank mold, may be simultaneously in the process of formation into completed articles, one (charge D) having been supplied to the blank mold and being enclosed thereby; the second and third, (charges B and C) which were earlier supplied to the same blank mold (11) and formed into blanks therein are reheating at intermediate transfer positions (R and R'); and the fourth charge (charge A) which was still earlier formed into a blank in the same blank mold being enclosed within the final blow mold (81).

Fig. 13 merely shows the next step in the process in which charge A has now been formed into a completed article of glass and has been removed from the blow mold, and each of the other charges are advanced one step, charge B being now enclosed within the blow mold, charges C and D in the form of blanks occupying the positions R and R' respectively, and a fifth charge E having been supplied to and being enclosed by the blank mold.

I have shown in Fig. 14 for purposes of illustration a possible time cycle of operation which may be practiced in making a particular bottle or other hollow glass article, which may take a total of 24 seconds for its complete formation. Under these circumstances, charges of glass may be supplied to the blank mold at seven second intervals. The first charge (A) may be in contact with the blank mold during blank formation for a period of five seconds after which it is supported in the tongs from fifth to the eighteenth second and is supplied to the blow mold at the end of that time. The blow mold contact in this case is for a period of six seconds, the reverting and inverting periods being indicated by the legends on the figure. It will be seen that while only a fragmentary part of an entire sequence is shown, that during at least a part of each cycle as measured by the time interval between supplying of successive charges of glass to the blank mold, four charges of glass will be simultaneously in the process of formation, as illustrated from seconds 21 to 24. At this time, charge A will be in contact with the blow mold, as in Fig. 12; charges B and C will be reheating in the tongs as in that figure; and charge D will be enclosed by the blank mold and at some stage in the process of formation into a blank therein. It is assumed, of course that the cycle of operations for each charge is divided in the same way as that particularly illustrated for charge A.

There are various other overlapping time relationships, all of which may be worked out from a consideration of Fig. 14, certain of these being claimed hereinafter. Thus it will be understood that while the cycle of operation for each article is identical with every other article during any one continuous operation of the machine, a plurality of articles may be in the process of formation simultaneously, this being the first machine to my knowledge wherein a single blank mold is used in conjunction with blowing means, that is, either one or more blow molds, wherein at least four charges of glass can be simultaneously in the process of formation at any one time. It is the purpose of this application to protect the essential features of this novel relationship and novel cycle, as well as the apparatus by which it may be performed.

Certain features of the embodiment of my invention herein shown are also embodied in the disclosure of the earlier application of Harold A. Wadman, Serial No. 707,060, filed January 18, 1934, upon which invention my present invention is in part an improvement. Such features as are common to the disclosures of this application and the aforesaid Wadman application are not my invention, but the invention of the said Wadman, and are claimed therein, the present claims being restricted to the subject matter not disclosed by the said Wadman application.

While I have shown and described but one particular mechanism embodying my invention, it will be understood that numerous changes may be made therein, certain of the broad principles thereof may be incorporated into other, and to some extent dissimilar types of machines, and certain of the operating instrumentalities herein illustrated and described may have independent utility. I do not wish to be limited therefore except by the scope of the appended claims, which are to be construed as broadly as the state of the prior art permits.

I claim:

1. The method of forming hollow glass articles, which comprises the steps of successively forming blanks in a blank mold, transferring the blanks successively from the blank mold to final blowing means, reheating said blanks during such transfer, there being at least two intermediate reheating positions for blanks between the blank mold and the final blowing means adapted to be simultaneously occupied by two successively formed blanks being transferred from the blank mold to the final blowing means, blowing the reheated blanks to final form in the final blowing means, and so timing the performance of the various steps of the above-recited method in forming a plurality of articles that at one time at least four charges of glass, all of which were supplied to the same blank mold, will be simultaneously in the process of formation into completed articles as follows: one having been supplied to the blank mold and being enclosed thereby; the second and third, which were earlier supplied to and formed into blanks in the same blank mold, reheating at the two intermediate positions as aforesaid; and the fourth, which was still earlier formed into a blank in the same blank mold and reheated as aforesaid, being enclosed in a blow mold of the final blowing means.

2. The method of forming hollow glass articles, which comprises the steps of successively forming blanks in a blank mold, transferring the blanks successively from the blank mold to final blowing means by the use of pural transfer means which are separate and distinct from the means by which the blanks are formed, supporting at least two blanks simultaneously in the transfer means at positions intermediate the ends of their paths of transfer for reheating the blanks, blowing the reheated blanks to final form in the final blowing means, and so timing the various steps of the above-recited method in forming a plurality of articles that at one time at least four charges of glass, all of which were supplied to the same blank mold, will be simultaneously in the process of formation into completed articles as follows: one having been supplied to the blank mold and being enclosed thereby; the second and third, which were earlier supplied to and formed into blanks in the same blank mold, reheating in the transfer means at intermediate positions of their paths of travel for transfer as aforesaid; and the fourth, which was still earlier formed into a blank in the same blank mold and reheated in one of the transfer means as aforesaid, being enclosed in a blow mold of the final blowing means.

3. The method of forming hollow glass articles, which comprises the steps of successively forming blanks in a blank mold, transferring the blanks successively from the blank mold to a final blow mold, reheating the blanks during such transfer, there being at least two intermediate reheating positions for blanks between the blank mold and final blow mold adapted to be simultaneously occupied by two successively formed blanks being transferred from the blank mold to the final blow mold, blowing the reheated blanks to final form in the final blow mold, and so timing the performance of the various steps of the above-recited method in forming a plurality of articles that at one time at least four charges of glass, all of which were supplied to the same blank mold, will be simultaneously in the process of formation into completed articles as follows: one having been supplied to the blank mold and being enclosed thereby; the second and third, which were earlier supplied to and formed into blanks in the same blank mold, reheating at the two intermediate positions as aforesaid; and the fourth, which was still earlier formed into a blank in the same blank mold and reheated as aforesaid, being enclosed in the final blow mold.

4. The method of forming hollow glass articles, which comprises the steps of forming a blank in a blank mold, removing the blank from the blank mold by tongs and supporting it at a reheating position out of registry and out of contact with any body mold surface, supplying a second charge of glass to the same blank mold while the first blank is being supported in the out of registry position as aforesaid, forming the second charge of glass into a blank in the blank mold, removing the second blank from the blank mold by a second tongs and moving it to a different reheating position out of contact and out of registry with any body mold surface while the first blank is still reheating in the out of registry position, supplying a third charge of glass to said blank mold and forming it into a blank therein at least partly during the time the first blank is being supported in its out of registry position as aforesaid, transferring the first blank to a final blow mold, returning the tongs which supported the first blank to the blank mold and removing the third blank therewith, and moving such third blank to the first named reheating position, and blowing the first blank to final form in the blow mold for a time period overlapping in point of time the supporting of the second and third blanks in their respective reheating positions by said tongs.

5. The method of forming hollow glass articles, which comprises the steps of supplying a charge of plastic glass to a blank mold and forming it into a blank therein, removing the blank from the blank mold by tongs and moving such blank to a reheating position out of registry and out of contact with any body mold surface, supplying a second charge of glass to the same blank mold and forming it into a blank therein during the time the first blank is at the reheating position as aforesaid, removing the second blank from the blank mold by a second tongs and moving it to a second reheating position out of registry and out of contact with any body mold surface all during the time the first blank is still reheating at the first named reheating position, supplying a third charge of glass to the same blank mold and forming it into a blank therein during a time period overlapping at least in part the time the first blank still occupies the first reheating position as aforesaid and the second blank occupies the second reheating position, transferring the first blank to a final blow mold and blowing it to final form therein for a period of time overlapping at least in part the time period the second and third blanks occupy the second and first reheating positions in the second and first tongs respectively, supplying a fourth charge of glass to the same blank mold and forming it into a blank therein during a time period overlapping at least in part the time the first charge of glass is being blown to final form in the final blow mold and the time the second and third charges of glass are maintained at the two reheating positions as aforesaid, and successively transferring the second, third and fourth blanks to the same final blow mold and blowing them to final form therein.

6. Apparatus for forming hollow glass articles, comprising a blank mold, means for forming blanks therein, final blowing means including at least one blow mold, means for transferring blanks formed in said blank mold to said final blowing means and providing at least two intermediate reheating stations between the blank mold and the final blowing means which may be simultaneously occupied by successively formed blanks, and means for timing the various operations of all the aforesaid means so constructed and arranged that during each cycle of operation of the apparatus, as measured by the time interval between the supplying of successive charges of glass to the blank mold, at least four charges of glass will be simultaneously in the process of formation as follows: the first having been supplied to said blank mold and being enclosed thereby; the second and third, which were successively formed into blanks in said blank mold, reheating at the two intermediate reheating stations respectively; and the fourth, which was still earlier formed into a blank in said blank mold and thereafter reheated as aforesaid, being enclosed in a blow mold of the final blowing means.

7. Apparatus for forming hollow glass articles, comprising a blank mold, means for forming blanks therein, final blowing means including at least one final blow mold, plural means separate and distinct from the blank forming means for transferring blanks formed in said blank mold to said final blowing means and constructed and arranged to provide at least two intermediate reheating stations for the transferring means respectively between the blank mold and the final blowing means which may be simultaneously occupied by successively formed blanks in such manner that the occupancy of one of said intermediate reheating stations will not interfere with the use and movement of another of the transferring means and the reheating of another blank at another reheating station, and means for timing the various operations of all the aforesaid means so constructed and arranged that during each cycle of operation of the apparatus, as measured by the time interval between the supplying of successive charges to the blank mold, at least four charges of glass will be simultaneously in the process of formation as follows: the first having been supplied to said blank mold and being enclosed thereby; the second and third, which were successively formed into blanks in said blank mold, reheating at two respective intermediate reheating stations at which they are supported by said transfer means; and the fourth, which was still earlier formed into a blank in said blank mold and thereafter reheated at one of said reheating stations, being enclosed in a final blow mold of the final blowing means.

8. Apparatus for forming hollow glass articles, comprising a blank mold, means for forming blanks therein, a final blow mold, means for blowing blanks to final form in said final blow mold, plural transfer means for transferring the blanks formed in said blank mold to said final blow mold through paths separate and distinct at least at an intermediate portion so as to provide for a plurality of intermediate reheating stations between said blank mold and said final blow mold which may be simultaneously occupied by a plurality of successively formed blanks, and means for timing the various operations of all the aforesaid means so constructed and arranged that during each cycle of operation of the apparatus, as measured by the time interval between the supplying of successive charges of glass to the blank mold, at least four charges of glass may be simultaneously in the process of formation as follows: the first having been supplied to said blank mold and being enclosed thereby; at least the second and third, which were successively formed into blanks in said blank mold, reheating at the respective intermediate positions of the transfer means, and the last, which was still earlier formed into a blank in said blank mold and thereafter reheated as aforesaid at one of said reheating stations, being enclosed in said blow mold.

9. Apparatus for forming hollow glass articles, comprising a blank mold, means for forming blanks therein, a final blow mold, means for blowing blanks to final form in said final blow mold, two tongs transfer means arranged for transferring blanks from said blank mold to said final blow mold in paths separate and distinct at least at an intermediate portion thereof, and means for timing the various operations of all the aforesaid means so constructed and arranged that the first blank will be formed in the blank mold, then removed therefrom and supported by one of said tongs transfer means at an intermediate position of the path thereof out of registry and out of contact with any body mold surface, a second charge of glass will be supplied to said blank mold and formed into a blank therein during the time the first charge is still reheating at the intermediate position as aforesaid, the second blank will then be removed by the other tongs transfer means and moved to a second reheating position out of contact and out of registry with any body mold surface while the first blank is still reheating at its reheating position supported by the first named tongs transfer means, a third charge of glass will be supplied to and formed into a blank in the blank mold during a time period overlapping at least in part the time the first and second blanks still occupy their intermediate positions and are reheating at such positions, and the first blank will then be transferred to said final blow mold and blown to final form therein during a period of time overlapping at least in part the time the second and third blanks are reheating at the second and first intermediate positions of the tongs transfer means respectively, the third blank being supported in the same transfer means by which the first blank was transferred to the final blow mold.

10. Apparatus for forming hollow glass articles, comprising a blank mold, means for forming blanks therein, a final blow mold, means for blowing blanks to final form in said final blow mold, two similar tongs transfer means for independently transferring blanks from said blank mold to separate and distinct intermediate reheating positions for the blanks and thence to the final blow mold, the intermediate reheating positions being individual to each of said tongs respectively and being adapted to be occupied simultaneously by said tongs supporting blanks therein in a manner independent of the position or movement of the other tongs, and timing means for controlling the operations of all the aforesaid means so constructed and arranged that when the apparatus as a whole is operated by being supplied with charges of plastic glass at the ends of uniform timed intervals, the apparatus may be operated as follows: a first charge of glass will be supplied to and formed into a blank in said blank mold and then may be moved by one of said tongs to the intermediate reheating position thereof; during the time the first blank is at its intermediate reheating position a second charge of glass will be supplied to said blank mold and formed into a blank therein; the second blank will then be moved to the other of said reheating positions while the first blank is still reheating at the intermediate position of its supporting tongs; a third charge of glass will be supplied to said blank mold during the time the first and second blanks are reheating at their respective reheating positions; the third charge of glass will be formed into a blank in said blank mold during a time period overlapping at least in part the time the first and second blanks are still reheating at their respective reheating positions; the first blank will be transferred to said final blow mold and finally blown therein; a fourth charge of glass will be supplied to said blank mold and enclosed thereby at a time that the first blank is enclosed by said final blow mold and final blowing pressure is being supplied thereto and at a time overlapping the time the second and third blanks occupy the two named reheating positions, and the blanks will be successively transferred to said final blow mold and blown to final form therein at the terminations of uniform time periods during which reheating of each blank occurs.

11. Apparatus for forming hollow glass articles, comprising a support, a blank mold and a blow mold mounted on said support in spaced relation with respect to each other, two independently operable tongs transfer means for transferring blanks from said blank mold to said blow mold, independent means to move each of said tongs transfer means in two-stage movement between said blank mold and said blow mold, the movement for each transfer means being first from said blank mold to an intermediate reheating position for blanks out of contact and out of registry with any body mold surface and such that the tongs and a blank held therein at such intermediate position will not interfere with movement of the other tongs transfer means and thereafter from the intermediate reheating position to a position in cooperation with said blow mold, means for forming blanks in said blank mold, and means for blowing blanks to final form in said blow mold.

12. Apparatus for forming hollow glass articles, comprising a support, a blank mold and a blow mold mounted on said support in spaced relation on substantially the same working level, means for forming blanks in said blank mold, means for blowing blanks to final form in said blow mold, and plural transfer means for transferring blanks from said blank mold to said blow mold in paths each having an intermediate portion laterally offset from the line of centers of said molds and including blank gripping means, means for operating said blank gripping means to engage and disengage blanks, and independent means for moving each of said gripping means in a two-step movement first from said blank mold to a position laterally intermediate said blank mold and said blow mold but out of the line of centers thereof a sufficient distance so that one transfer means may support a blank in such intermediate position while the other transfer means is moved to and through its respective intermediate position and a second step of the movement from the intermediate position to the blow mold.

13. Apparatus for forming hollow glass articles, comprising a support, a blank mold and a blow mold mounted on said support in spaced relation to each other and on substantially the same working level, means for forming blanks in said blank mold, means for blowing the blanks to final form in said blow mold, and means for transferring blanks from said blank mold to said blow mold, the last named means including a parallel motion linkage arranged for movement in a path parallel to the line of centers of said molds, tongs supported by said parallel linkage and also movable in respect thereto in a direction perpendicular to the line of centers of said molds, means for moving said parallel linkage to move said tongs from the blank mold to an intermediate position and from said intermediate position to the blow mold, and means operated in response to the last named movement for moving said tongs in a direction perpendicular to the line of centers of said molds.

14. Apparatus for forming hollow glass articles, comprising a support, a blank mold and a blow mold on said support, means for forming blanks in said blank mold, means for blowing blanks to final form in said blow mold, a pair of similar tongs mechanisms for transferring blanks from said blank mold to said blow mold, independent means for moving each of said tongs mechanisms from said blank mold to an intermediate position and thereafter from said intermediate position to said blow mold, the intermediate positions for said tongs mechanisms being laterally offset with respect to each other a distance sufficient to permit one tongs mechanism to support a blank at its respective intermediate position during movement of the other tongs mechanism to and through its respective intermediate position in either direction, bottom plate means for controlling the elongation of blanks at the two intermediate positions respectively, and independent means for moving each of said bottom plate means to and from its operative position.

15. Apparatus for forming hollow glass articles, comprising an invertible blank mold, a non-invertible neck ring cooperating therewith, means for opening and closing said blank mold, means for forming a blank in said blank mold and neck ring in neck-down position, means for thereafter opening said neck ring, means for relatively moving said blank mold and neck ring to free the blank mold and the formed blank therein for inversion, means for then inverting the blank mold and the blank therein from a neck-down to a neck-up position, a blow mold, means for transferring the blank by its neck portion from the blank mold to the blow mold, and means for blowing the blank to final form in the blow mold.

16. Apparatus for forming hollow glass articles, comprising an invertible blank mold, a non-invertible neck ring cooperable with said blank mold, means for opening and closing said blank mold, means for forming a blank in said blank and neck ring in neck-down position, means for thereafter opening said neck ring, means for moving said neck ring vertically downward to free the blank mold and the blank therein for inversion, means operable thereafter for reverting the blank mold and the blank therein from a neck-down to a neck-up position, a blow mold, means for transferring the blank by its neck portion from the blank mold to the blow mold, and means for blowing the blank to final form in the blow mold.

17. Apparatus for forming hollow glass articles, comprising an invertible blank mold, a non-invertible neck ring cooperable therewith, means for opening and closing said blank mold, means for moving said neck ring to and from a position in cooperation with and beneath said blank mold in a substantially vertical direction, a neck pin movable with said neck ring and also movable with respect thereto to and from a position to form a blow opening in the neck of a blank, means for settle blowing a charge of glass supplied to said blank mold to form a finished neck portion thereon in said neck ring and around said neck pin, means for withdrawing said neck pin out of contact with the glass by movement with respect to said neck ring, means for counterblowing the blank by supplying pressure to the interior of said neck ring and to the blow opening formed by said neck pin, means for opening said neck ring to free the neck of the blank thus formed, said neck ring and neck pin being then moved downward as a unit to free the blank mold and the blank therein for inversion, means for reverting the blank mold and the blank therein from a neck-down to a neck-up position, a blow mold, means for transferring the blank thus formed from the blank mold to the blow mold by its neck portion, and means for blowing the blank to final form in the blow mold.

18. The method of forming hollow glass articles, which comprises the steps of supplying a charge of plastic glass to a blank mold and a cooperating neck ring through the open upper end of the former, settling the charge of glass therein and around a neck pin cooperating with the neck ring, withdrawing the neck pin out of engagement with the glass, counterblowing the settled glass in the blank mold and neck ring to complete the formation of a glass blank, stripping the neck ring from the formed blank to expose the neck portion of the blank to the atmosphere, reverting the blank mold to a neck-up position while still closed about the formed blank, grasping the exposed neck of the blank in a transfer means, opening the blank mold to expose the body portion of the blank, reheating the blank while suspended from the transfer means, transferring the blank to a blow mold, and blowing the blank to final form in the blow mold.

19. The method of forming hollow glass articles, which comprises the steps of successively forming blanks in a blank mold, transferring the blanks successively from the blank mold to final blowing means, reheating the blanks during such transfer and while they are out of registry and out of contact with any body mold, blowing the reheated blanks to final form in the final blowing means, and so timing the performance of the various steps of the above-recited method in forming a plurality of articles that at one time at least four charges of glass, all of which were supplied to the same blank mold, will be simultaneously in the process of formation into completed articles as follows: one having been supplied to the blank mold and being enclosed thereby; at least two others, which were earlier supplied to and formed into blanks in the same blank mold, reheating as aforesaid; and another, which was still earlier formed into a blank in the same blank mold and reheated as aforesaid, being enclosed in a blow mold of the final blowing means.

ALGY J. SMITH.